(12) United States Patent
Lee et al.

(10) Patent No.: US 11,579,024 B2
(45) Date of Patent: Feb. 14, 2023

(54) SPEAKER INTEGRATED ENVIRONMENTAL SENSORS

(71) Applicant: Apple Inc., Cupertino, CA (US)

(72) Inventors: William S. Lee, Fremont, CA (US);
Tyler B. Cater, San Jose, CA (US);
Shannon X. Yang, Sunnyvale, CA (US); Justin D. Crosby, Cupertino, CA (US); Timothy S. Lui, San Jose, CA (US); Eric N. Nyland, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 306 days.

(21) Appl. No.: 16/040,290

(22) Filed: Jul. 19, 2018

(65) Prior Publication Data

US 2019/0025133 A1    Jan. 24, 2019

Related U.S. Application Data

(60) Provisional application No. 62/535,208, filed on Jul. 20, 2017.

(51) Int. Cl.
*G01K 7/02* (2021.01)
*H04R 1/02* (2006.01)
(Continued)

(52) U.S. Cl.
CPC .................. *G01K 7/02* (2013.01); *G01K 1/16* (2013.01); *G06F 3/02* (2013.01); *G06F 3/0412* (2013.01);
(Continued)

(58) Field of Classification Search
CPC .......... H04M 1/03; H04M 1/035; H04M 1/00; H04R 1/02; H04R 1/021; H04R 1/023;
(Continued)

(56) References Cited

U.S. PATENT DOCUMENTS 6,639,987 B2   10/2003   McIntosh
9,042,588 B2    5/2015   Aase
(Continued)

FOREIGN PATENT DOCUMENTS

EP           3076638 A1      10/2016
WO      WO 2016/190957      12/2016

OTHER PUBLICATIONS

International Search Report and Written Opinion from PCT/US2018/042954, dated Sep. 14, 2018, 13 pages.

*Primary Examiner* — Walter F Briney, III
(74) *Attorney, Agent, or Firm* — BakerHostetler (57) ABSTRACT

Aspects of the subject technology relate to electronic devices having sensors such as pressure sensors. A pressure sensor may be integrated into an audio component of an electronic device such that the pressure sensor is fluidly coupled to an environment external to a device housing via at least a portion of an internal cavity of the audio component housing. The audio component housing may include an opening. The pressure sensor may be mounted adjacent to or within the opening. The opening may be sealed to prevent passage of gas or liquid through the opening. The pressure sensor may be integrally formed with an inner wall of the audio component housing. The audio component may be a speaker or a microphone.

20 Claims, 3 Drawing Sheets

(51) Int. Cl.
| | |
|---|---|
| *H04M 1/03* | (2006.01) |
| *H04R 1/08* | (2006.01) |
| *G01K 1/16* | (2006.01) |
| *G06F 3/02* | (2006.01) |
| *G06F 3/041* | (2006.01) |
| *H04R 1/10* | (2006.01) |
| *H04R 3/04* | (2006.01) |

(52) U.S. Cl.
CPC .............. *H04M 1/03* (2013.01); *H04R 1/025* (2013.01); *H04R 1/08* (2013.01); *H04R 1/1041* (2013.01); *H04R 3/04* (2013.01); *H04M 2250/12* (2013.01); *H04R 1/023* (2013.01); *H04R 2499/11* (2013.01)

(58) Field of Classification Search
CPC ........ H04R 1/025; H04R 1/026; H04R 1/028; H04R 1/06; H04R 1/086; H04R 1/20; H04R 1/22; H04R 1/222; H04R 1/225; H04R 1/28; H04R 1/2803; H04R 1/2807; H04R 1/2811; H04R 1/2823; H04R 1/2826; H04R 1/2846; H04R 1/2849; H04R 1/2869; H04R 1/2873; H04R 1/2876; H04R 1/288; H04R 1/2884; H04R 1/2888; H04R 1/2892; H04R 1/2896; H04R 3/00; H04R 3/007; H04R 29/00; H04R 29/001; H04R 29/003; H04R 29/004; H04R 2201/00; H04R 2201/02; H04R 2201/028; H04R 2201/029; H04R 2499/00; H04R 2499/10; H04R 2499/11; H04R 2499/15
See application file for complete search history.

(56) References Cited

U.S. PATENT DOCUMENTS

| | | | |
|---|---|---|---|
| 9,167,325 | B2 | 10/2015 | Yang et al. |
| 9,217,675 | B2 | 12/2015 | Yang et al. |
| 9,351,068 | B2 | 5/2016 | Slupeiks et al. |
| 9,503,829 | B2 | 11/2016 | Baskaran et al. |
| 9,761,988 | B1* | 9/2017 | Lin .................... H01R 13/5216 |
| 2007/0274531 | A1 | 11/2007 | Camp |
| 2009/0116658 | A1* | 5/2009 | An .......................... H04R 1/406 |
| | | | 381/71.1 |
| 2014/0112510 | A1 | 4/2014 | Yang et al. |
| 2014/0193018 | A1 | 7/2014 | Lim et al. |
| 2015/0003663 | A1* | 1/2015 | Biessy ................... H04R 9/025 |
| | | | 381/400 |
| 2015/0292954 | A1* | 10/2015 | Takeda ..................... G01K 7/16 |
| | | | 374/183 |
| 2015/0319534 | A1* | 11/2015 | Lippert .................. H04R 1/023 |
| | | | 381/165 |
| 2016/0052017 | A1* | 2/2016 | Weber .................. H04R 29/001 |
| | | | 156/60 |
| 2016/0353186 | A1 | 12/2016 | Rothkopf |
| 2017/0034323 | A1* | 2/2017 | Sun ......................... H04M 1/03 |
| 2017/0131169 | A1* | 5/2017 | Takimoto ............ G01L 19/0645 |
| 2017/0353783 | A1* | 12/2017 | Hou ...................... H04R 1/2873 |
| 2018/0206354 | A1* | 7/2018 | Yoon ....................... H04M 1/03 |
| 2019/0166422 | A1* | 5/2019 | Cho ........................ H04R 1/345 |
| 2020/0275214 | A1* | 8/2020 | Miyagawa ............... H04R 7/18 |

* cited by examiner

SPEAKER INTEGRATED ENVIRONMENTAL SENSORS

CROSS-REFERENCE TO RELATED APPLICATIONS

The present application claims the benefit of U.S. Provisional Patent Application Ser. No. 62/535,208, entitled "SPEAKER INTEGRATED ENVIRONMENTAL SENSORS" filed on Jul. 20, 2017, which is hereby incorporated by reference in its entirety for all purposes.

TECHNICAL FIELD

The present description relates generally to electronic devices, and more particularly, but not exclusively, electronic devices having environmental sensors.

BACKGROUND

Electronic devices such as computers, media players, cellular telephones, and other electronic equipment are often provided with sensors such as accelerometers, temperatures sensors, light sensors, or pressure sensors. It can be challenging to integrate sensors into electronic devices, particularly in compact devices such as portable electronic devices.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Portable electronic devices such as a mobile phones, portable music players, smart watches, tablet computers, and laptop computers often include a pressure sensor for sensing environmental pressure. The pressure sensor is sometimes used for barometric pressure measurements and/or can be combined with other sensors such as temperature sensors, humidity sensors, and gas concentration sensors, to monitor the environment surrounding the device.

Pressure sensors are often disposed within the housing of the electronic device and are able to sense the environmental pressure outside the housing due to airflow from outside the housing into the housing at various openings or ports. However, it is also desirable to increase water resistance for portable electronic devices to prevent internal water damage in moist or wet environments or when the device is dropped or otherwise dipped or submerged into a liquid.

In accordance with various aspects of the subject disclosure, a portable electronic device such as a smart phone, a tablet, or a smart watch includes an audio component such as a speaker or a microphone. The audio component is disposed within a portion of a housing of the portable electronic device near a port that allows sound to pass into and/or out of the housing. The port may be an open port or may be covered or partially covered with a membrane or a mesh structure that is permeable to sound and air. The audio component includes an audio component housing that is disposed within the electronic device housing. The audio component housing is at least partially disposed within a main cavity that is defined by the housing and that is sealed against liquid ingress. The audio component housing may form at least a portion of a barrier against the liquid ingress into the main cavity. Electronic components for the device such as one or more processors, batteries, memory circuits, application-specific integrated circuits, communications components, display circuitry, and/or other electronic components are housed in the main cavity.

The portable electronic device includes one or more environmental sensors such as a pressure sensor. The pressure sensor may be disposed entirely within the audio component housing or may include a portion disposed within the main cavity of the housing that is sealed against liquid ingress. The pressure sensor may receive an environmental pressure through an opening in the audio component housing or the pressure sensor may be formed partially within the opening, or within or integral with the audio component housing. For example, the pressure sensor may have a sensor housing with a sensor port that is aligned within the opening in the speaker housing. The opening in the speaker housing may be fluidly coupled to the ambient environment by the port in the electronic device housing.

In some implementations, the pressure sensor may be mounted to an exterior surface of the speaker housing such that a pressure sensor element is aligned over the opening in the speaker housing. In other implementations, the pressure sensor element may be located at least partially within the opening in the speaker housing. In other implementations, the pressure sensor element may be integrated into the audio component housing.

In implementations in which the pressure sensor is mounted to the exterior surface of the audio component housing or mounted at least partially within the opening in the audio component housing, a sealing membrane or a sealing material may be disposed over the pressure sensor to prevent liquid or gas from passing through the opening in the audio component housing into the main cavity of the device housing.

Because a speaker includes a moving membrane that can be electronically controlled by the processing circuitry of the device, the speaker can be operated to clear liquid such as water from within the speaker port. In this way, negative effects of liquid in the vicinity of the pressure sensor can also be reduced or eliminated.

Figure 1:
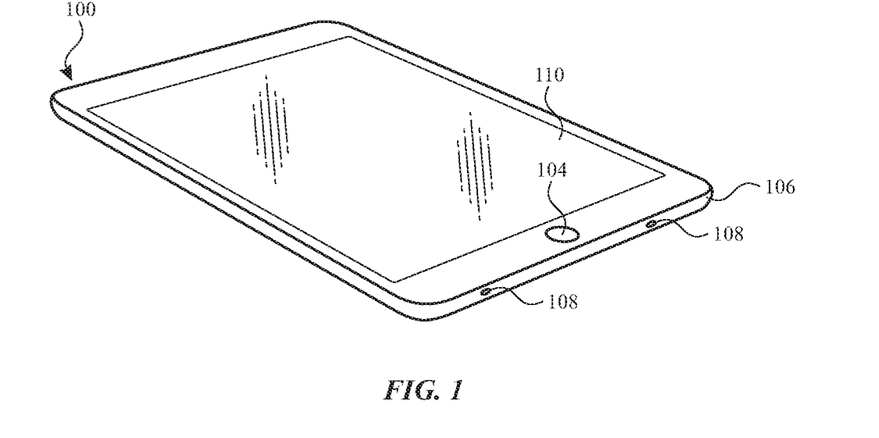
FIG. 1 illustrates a perspective view of an example electronic device having a sensor in accordance with various aspects of the subject technology.

An illustrative electronic device including a sensor and an audio component is shown in FIG. 1. In the example of FIG. 1, device 100 has been implemented using a housing that is sufficiently small to be portable and carried by a user (e.g., device 100 of FIG. 1 may be a handheld electronic device such as a tablet computer or a cellular telephone or smart phone). As shown in FIG. 1, device 100 includes a display such as display 110 mounted on the front of housing 106. Device 100 includes one or more input/output devices such as a touch screen incorporated into display 110, a button or switch such as button 104 and/or other input output components disposed on or behind display 110 or on or behind other portions of housing 106. Display 110 and/or housing 106 include one or more openings to accommodate button 104, a speaker, a light source, or a camera.

In the example of FIG. 1, housing 106 includes two openings 108 on a bottom sidewall of housing. One or more of openings 108 forms a port for an audio component. For example, one of openings 108 may form a speaker port for a speaker disposed within housing 106 and another one of openings 108 may form a microphone port for a microphone disposed within housing 106. Openings 108 may be open ports or may be completely or partially covered with a permeable membrane or a mesh structure that allows air and sound to pass through the openings. Although two openings 108 are shown in FIG. 1, this is merely illustrative. One opening 108, two openings 108, or more than two openings 108 may be provided on the bottom sidewall (as shown) on another sidewall (e.g., a top, left, or right sidewall), on a rear surface of housing 106 and/or a front surface of housing 106 or display 110. In some implementations, one or more groups of openings 108 in housing 106 may be aligned with a single port of an audio component within housing 106.

Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a somewhat smaller portable device such as a smart watch, a pendant device, or other wearable or miniature device, a media player, a gaming device, a navigation device, a computer monitor, a television, a headphone, or other electronic equipment.

For example, in some implementations, housing 106 may be formed using a unibody configuration in which some or all of housing 106 is machined or molded as a single structure or may be formed using multiple structures (e.g., an internal frame structure, one or more structures that form exterior housing surfaces, etc.). Although housing 106 of FIG. 1 is shown as a single structure, housing 106 may have multiple parts. For example, housing 106 may have upper portion and lower portion coupled to the upper portion using a hinge that allows the upper portion to rotate about a rotational axis relative to the lower portion. A keyboard such as a QWERTY keyboard and a touch pad may be mounted in the lower housing portion, in some implementations.

In some implementations, electronic device 100 may be provided in the form of a computer integrated into a computer monitor. Display 110 may be mounted on a front surface of housing 106 and a stand may be provided to support housing (e.g., on a desktop).

Figure 2:
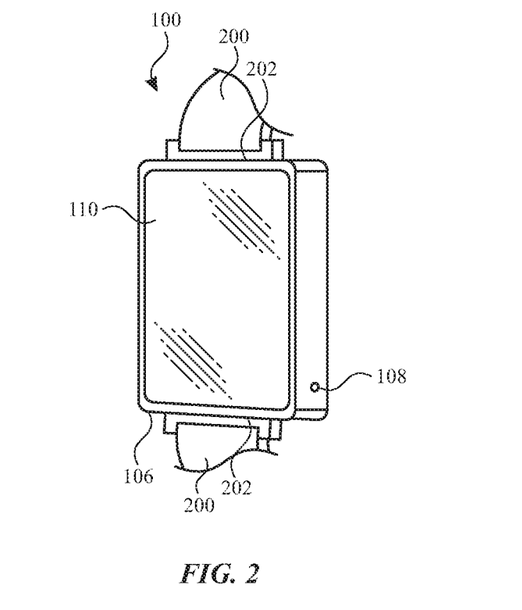
FIG. 2 illustrates a perspective view of another example electronic device having a sensor in accordance with various aspects of the subject technology.

In some implementations, electronic device 100 may be provided in the form of a wearable device such as a smart watch. FIG. 2 shows an example of electronic device 100 implemented in the form of a smart watch. As shown in FIG. 2, in some implementations, housing 106 may include one or more interfaces 202 for mechanically coupling housing 106 to a strap 200 or other structure for securing housing 106 to a wearer. For example, strap 200 may be a wristband that secures housing 106 to a wearer's wrist such that display 110 is visible in the form of a watch face. In the implementation shown in FIG. 2, housing 106 includes an opening 108 in a sidewall of housing 106. It should be appreciated that, although device 100 one opening in the example of FIG. 2, device 100 may include one, two, three, four, or more than four openings. Device 100 may include one, two, three, or more than three audio components each mounted adjacent to one or more of openings 108.

A speaker disposed within housing 106 transmits sound through at least one associated opening 108. A microphone may also be provided within housing 106 that receives sound through at least one associated opening in the housing. An audio component membrane such as a speaker membrane or microphone membrane is located in a portion of housing 106 that receives a flow of air from an exterior or ambient environment. That portion of the housing is separate from a main cavity of the housing in which electronic components (e.g., one or more processors, one or more electronic storage media, one or more batteries, a display, one or more integrated circuits, sensors or other components for operation of the device) are located. The main cavity of the housing may be a waterproof or a water-resistant portion that is separate from the portion in which the audio component membrane is disposed. The separate portion in which the audio component membrane is disposed may be an interior cavity of a housing for the audio component, the audio component housing providing at least a part of a barrier between the ambient air and the main cavity of the device housing.

Figure 3:
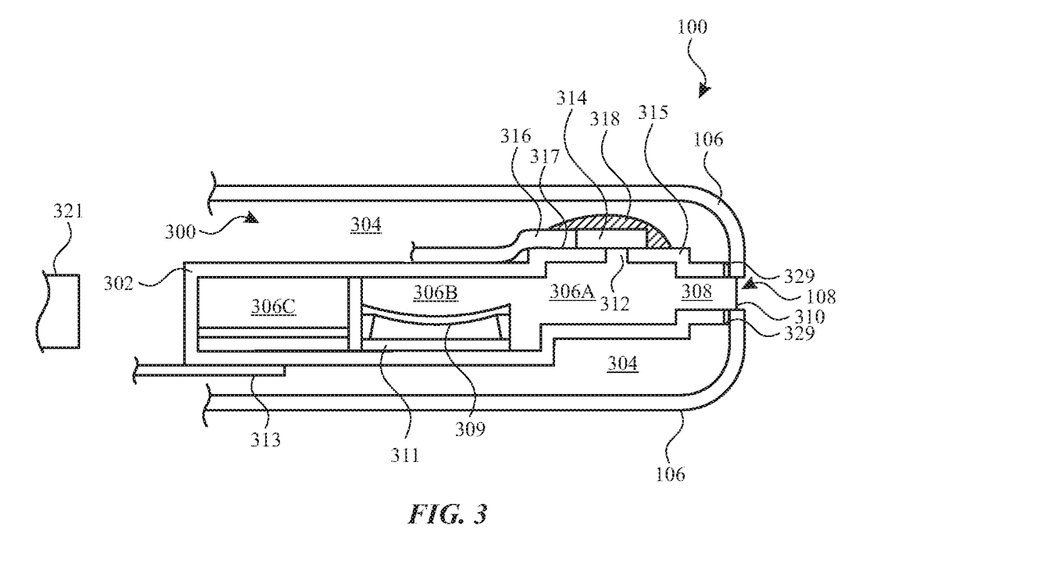
FIG. 3 illustrates a cross-sectional side view of a portion of an example electronic device having a speaker-integrated sensor in accordance with various aspects of the subject technology.

FIG. 3 shows a cross-sectional view of a portion of device 100 in which an audio component is mounted. In the example of FIG. 3, device 100 includes speaker 300. Speaker 300 includes speaker housing 302 mounted adjacent at least one opening 108 in device housing 106. Speaker housing may be formed form one or more materials such as plastic or metal. In some implementations, speaker housing 302 is a monolithic of multi-part structure formed, for example, from molded plastic. In other implementations, speaker housing 302 may include a molded plastic structure having a planar metal portion disposed in an opening in the molded plastic housing (e.g., a planar metal member formed over a speaker membrane of the speaker). Speaker housing 302 includes a port 308 that is aligned with opening 108 so that sound generated by speaker membrane 309 (e.g., responsive to control signals received by speaker circuitry 311) within speaker housing 302 can be transmitted through port 308 and opening 108 to the external environment. Port 308 may be an open port or may include a cover 310 such as a membrane or a mesh structure that discourages entry of liquid into speaker housing 302, but that is permeable to sound and air. Cover 310 may discourage entry of liquid into speaker housing 302 but may be insufficient to prevent entry of all liquid, particularly in high moisture environments such as prolonged exposure to high humidity or in the event of a spill of liquid onto device 100 or a drop or a deliberate submersion of device 100 into a liquid.

As shown, speaker housing 302 is formed within a main cavity 304 within device housing 106. Speaker housing 302 includes an internal cavity that is separate from main cavity 304. In the example of FIG. 3, the internal (inner) cavity of speaker 300 includes first chamber 306A, second chamber 306B, and third chamber 306C. Speaker membrane 309 is disposed in second chamber 306B which is disposed between first chamber 306A and third chamber 306C. First chamber 306A forms a front volume of the speaker that is adjacent to the output port 308. Third chamber 306C forms a back volume for the speaker.

In the example of FIG. 3, speaker membrane 309 is operated to generate sound by speaker circuitry 311 (e.g., one or more magnets, one or more coils, and/or additional speaker control circuitry such as signal processing circuitry or other processing circuitry). Device circuitry 321 such as a central processing unit, a sound card, and/or other dedicated audio circuitry may generate control signals for speaker 300 and may provide those control signals to speaker circuitry 311 via a control line 313. Control line 313 may be a wire, a cable (e.g., a coaxial cable) or a flexible integrated circuit (as examples) coupled to one or more electrical contacts on speaker housing 302. Device circuitry 321 is disposed in main cavity 304. Device circuitry 321 may be liquid-sensitive circuitry that would be damaged if exposed to moisture or liquid. Moisture and/or liquid from outside of device housing 106 is prevented from reaching device circuitry 321, by a barrier formed, at least in part, by audio component housing 302. In this way, device 100 is provided with a sealed internal cavity 304 within which sensitive electronics are located, while ambient access is also provided for audio and environmental-sensing components.

In the example of FIG. 3, pressure sensor 314 is mounted on an outer surface of speaker housing 302. An opening 312 is provided in a wall 315 of speaker housing 302. Pressure sensor 314 is mounted to housing 302 adjacent opening 312 so that ambient air that has passed into the interior cavity of speaker housing 302 is provided to pressure sensor 314 via opening 312. Pressure sensor 314 may include a sensor housing having a port (not explicitly shown), aligned with opening 312, into which the ambient air flows, or pressure sensor 314 may have a pressure sensing membrane or material mounted directly adjacent opening 312 as in the example of FIG. 3. Pressure signals generated by pressure sensor 314 may be provided to processing circuitry 321 via a signal line 316 communicatively coupled to the pressure sensor. Signal line 316 may be a wire, a cable, or a flexible integrated circuit (as examples).

In the example of FIG. 3, an encapsulation layer 318 is provided over pressure sensor 314. Encapsulation layer 318 seals pressure sensor 314 over opening 312 to prevent moisture or gas from within the internal cavity of speaker housing 302 from passing into main cavity 304 of device 100. Encapsulation layer 318 may be formed from, for example, a resin or epoxy material or another suitable water impermeable material. In this example, speaker housing 302, pressure sensor 314, and encapsulation layer 318 cooperate to form a sealing barrier between opening 108 and main cavity 304. One or more sealing members 329 may be provided at the interface of speaker housing 302 and device housing 106 to prevent passage of liquid or gas through a space between speaker housing 302 and device housing 106. In some implementations, an additional interface structure may be provided (e.g., sealingly disposed) between port 308 of speaker housing 302 and opening 108.

In some scenarios, moisture may enter into the internal cavity of speaker housing 302 (e.g., into port 308, chamber 306A or 306B), which can negatively affect the performance of speaker 300 and/or pressure sensor 314. In some scenarios, speaker membrane 309 may be actuated to purge water from the internal cavity of speaker housing 302 out through port 308 and opening 108.

In the example of FIG. 3, pressure sensor 314 is mounted to an external surface 317 (located interior to device housing 106) of speaker housing 302, without any portion extending into opening 312. However, this is merely illustrative. In other configurations, pressure sensor 314 may be formed at least partially within opening 312.

Figure 4:
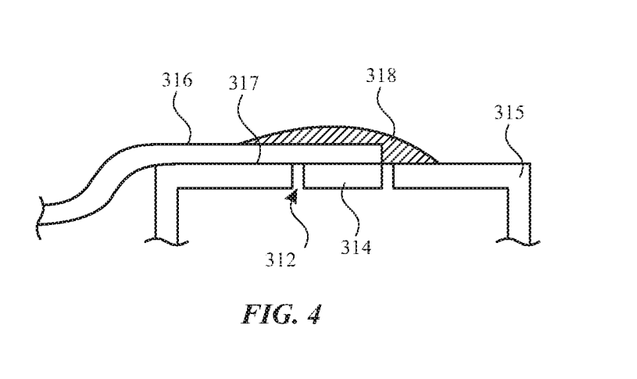
FIG. 4 illustrates a cross-sectional side view of a portion of another example speaker-integrated sensor in accordance with various aspects of the subject technology.

FIG. 4 shows an example of pressure sensor 314 in an implementation in which the pressure sensor is disposed within opening 312. As shown in FIG. 4, opening 312 may be sufficiently wide to accommodate pressure sensor 314 therewithin. In the example of FIG. 4, the entirety of pressure sensor 314 is disposed within opening 312 and pressure sensor 314 is attached to flexible circuit 316 which lays flush on the external surface 317 of speaker housing 302. The portion of pressure sensor 314 that is disposed within opening 312 may be contained within opening 312 or may extend into the internal cavity of speaker housing 302.

The portion of pressure sensor 314 that is disposed within opening 312 may include a pressure sensing element (e.g., a MEMS element, a piezo element, a membrane coupled to a capacitive or resistive transducer circuit, etc.) and processing circuitry for the pressure sensor. In other implementations, processing circuitry for the pressure sensor may be disposed above the opening 312 (e.g., at least partially within main cavity 304) and coupled to flexible circuit 316. The portion of pressure sensor 314 that is disposed within opening 312 may, in some implementations, include a sensor housing in which the pressure sensing element and the processing circuitry are enclosed (e.g., a sensor housing with a sensor port that allows airflow into the housing to the pressure sensing element). In some implementations, pressure sensor 314 may be provided without a sensor housing (e.g., the portion of pressure sensor 314 that is disposed within opening 312 may include the pressure sensing element and the processing circuitry on which the pressure sensing element is disposed without a covering or housing, or the portion of pressure sensor 314 that is disposed within opening 312 may include the pressure sensing element, with the processing circuitry on which the pressure sensing element is disposed being located above opening 312 without a covering or housing over the pressure sensing element or the processing circuitry).

In the example of FIG. 4, encapsulation layer 318 is formed over a portion of flexible circuit 316 and opening 312 to seal opening 312 to prevent moisture or gas from passing through opening 312 into main cavity 304 of device housing 106. In various examples, the components of pressure sensor 314 may substantially fill opening 312 (e.g., a sensor housing of the pressure sensor may be press fit into opening 312), a portion of opening 312 surrounding pressure sensor 314 may be free of material, or an encapsulating material such as a portion of encapsulation layer 318 may be disposed within opening 312.

In the examples of FIGS. 3 and 4, an opening is provided in the speaker housing through or within which ambient air pressure can be sensed by pressure sensor 314. In these examples, speaker membrane 309 is entirely disposed within the internal cavity of speaker housing 302 and pressure sensor 314 receives ambient air through or within an opening in that speaker housing. However, in other implementations, pressure sensor 314 may be fully integrated with speaker 300. For example, pressure sensor can be an integrally formed portion of speaker 300 such that pressure sensor signals are provided from pressure sensor 314, and control signals for speaker 300 are transmitted, through a common connection to the integrated speaker/sensor module.

For example, pressure sensor signals can be transmitted through a flexible circuit 313 that is communicatively coupled to speaker 300 (e.g., via contacts on speaker housing 302) and that carries control signals for speaker membrane 309.

Figure 5:
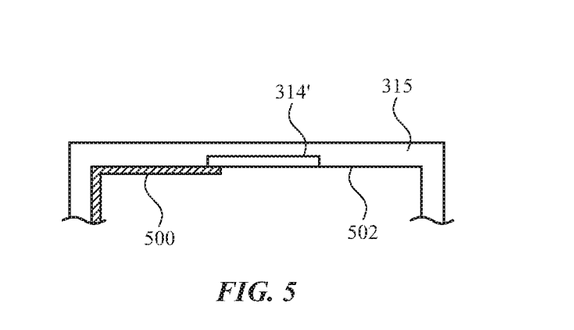
FIG. 5 illustrates a cross-sectional side view of a portion of another example speaker-integrated sensor in accordance with various aspects of the subject technology.

FIG. 5 shows an example of a fully integrated speaker/sensor module. In the example of FIG. 5, pressure sensor 314' is integrated into a portion of speaker housing 302. For example, pressure sensor 314' may include a pressure sensing element (as described herein) embedded within a recess in an internal surface 502 of speaker housing 302. An embedded pressure sensor 314' as shown in FIG. 5 may include a sensor housing that is mounted within the recess or the embedded pressure sensor may be provided without a separate sensor housing. For example, in various implementations, the embedded pressure sensing element may be a MEMS sensor directly mounted within the recess or a pressure actuatable membrane mounted on a control circuit such as an application-specific integrated circuit (ASIC) that is mounted within the recess. In some implementations, pressure sensor 314 may be a MEMS or other actuable structure that is etched or printed into the material of speaker housing 302.

As shown in FIG. 5, electrical routing such as connector 500 (e.g., one or more wires, a cable, a flexible circuit) that is interior to speaker housing 302 may be provided to transmit pressure signals from pressure sensor 314 to an external connection on speaker housing 302 for speaker 300. Alternatively, some or all of connector 500 may be embedded within or may pass through speaker housing 302. For example, connector 500 may be implemented as one or more conductive posts that pass through a portion of housing 302 to form (or couple to) separate contacts for pressure sensor 314' on an exterior surface of speaker housing 302 (e.g., separate from additional contacts for speaker circuitry 311).

In the examples of FIGS. 3-5, pressure sensor 314 (or 314') is disposed adjacent to first chamber 306A. It has been discovered that pressure effects generated by the operation of speaker membrane 309, which can negatively affect pressure sensor measurements for a pressure sensor in the vicinity of a speaker) can be reduced when the pressure sensor is mounted within or adjacent to the front volume (e.g., first chamber 306A) of a speaker housing having a back volume (e.g., third chamber 306C) and a speaker membrane disposed in a chamber (e.g., second chamber 302B) that is disposed between the front volume and the back volume. For example, a pressure sensor that is mounted within or adjacent to the front volume (e.g., first chamber 306A) of a speaker housing may experience a lower particle velocity and a lower oscillatory pressure from the speaker membrane than a pressure sensor mounted in other locations on the speaker housing. However, other considerations may cause pressure sensor to be mounted at other locations on or within housing 302.

Figure 6:
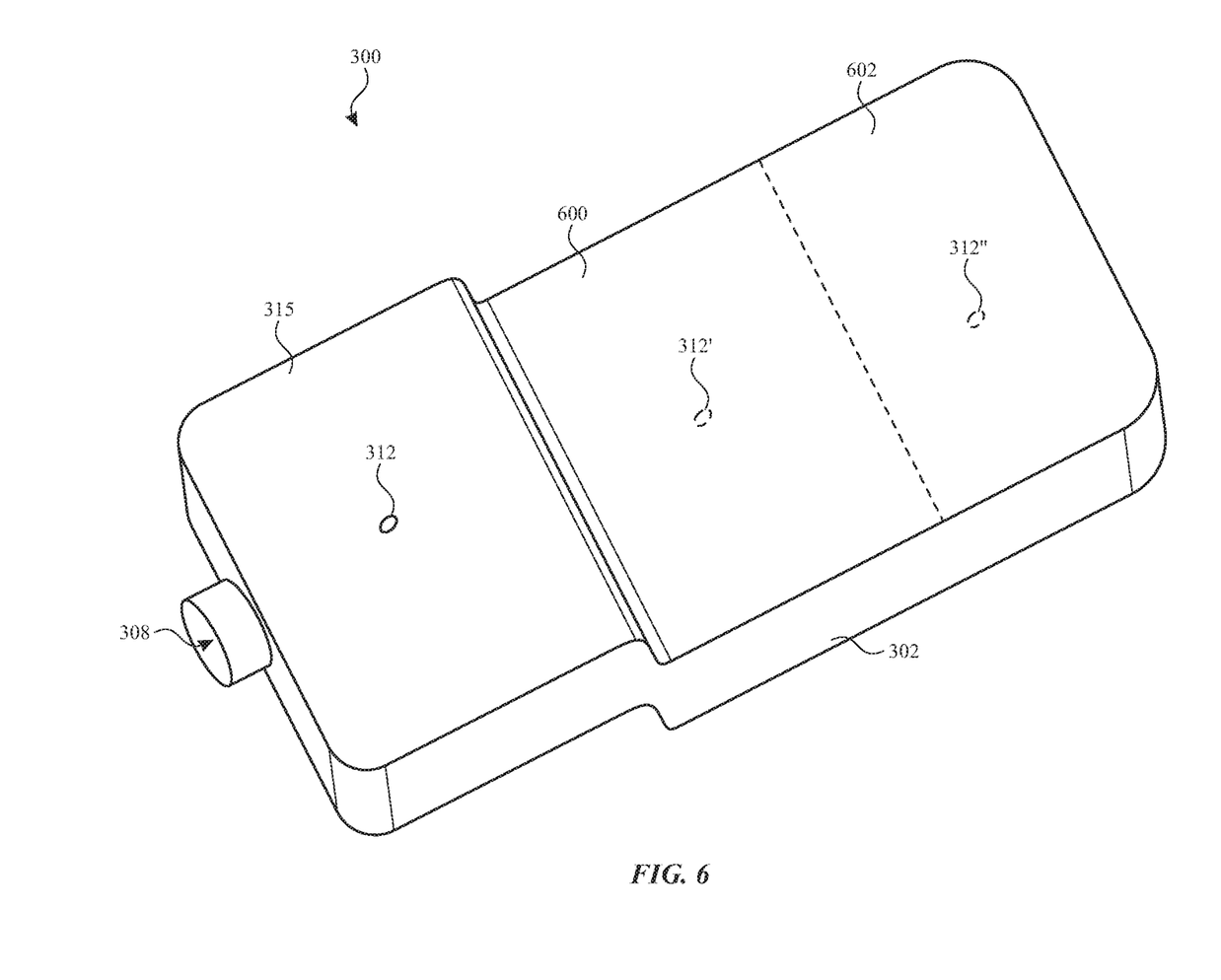
FIG. 6 illustrates a top perspective view of a speaker housing in accordance with various aspects of the subject technology.

FIG. 6 is a top perspective view of speaker housing 302 in accordance with various aspects. In the example of FIG. 6, opening 312 can be seen in wall 315 of housing 302 in the front volume location shown in FIGS. 3 and 4. In the example of FIG. 5, embedded sensor 314' would be disposed interior to the location at which opening 312 is shown in FIG. 6, without an opening in the housing. However, it should be appreciated that opening 312 and pressure sensor 314 or pressure sensor 314' can be formed at other locations on housing 302. FIG. 6 shows portions 600 and 602 of speaker housing 302 that correspond, respectively, to second chamber 306B and third chamber 306C of the internal cavity of speaker housing 302.

As shown, an opening 312' can be formed in the wall of portion 600 corresponding to the second chamber 306B or an opening 312" can be formed in the wall of portion 602 corresponding to the third chamber 306C (as examples). In yet other examples, openings can be formed in a bottom surface or on a sidewall of speaker housing 302.

In implementations in which pressure sensor 314 receives ambient pressure via an opening such as opening 312, 312', or 312", the pressure sensor is mounted over, or within, the opening and encapsulated (as shown in FIGS. 3 and 4) at any suitable location of the opening. An embedded pressure sensor 314' can be formed in any suitable wall surface within speaker housing 302 (e.g., a top surface of second chamber 306B, a top surface of third chamber 306C, a sidewall surface, or a bottom surface within housing 302).

In accordance with some aspects of the subject disclosure, a portable electronic device is provided that includes a device housing having an opening. The device also includes an audio component having an audio component housing that is disposed within the device housing, the audio component housing having a sensor opening and a port. The port is disposed adjacent to the opening in the device housing to allow flow of air and sound between an internal cavity of the audio component housing and an environment outside the device housing through the opening via the port. The device also includes an audio component membrane disposed entirely within the internal cavity of the audio component housing. The device also includes a pressure sensor fluidly coupled to the environment outside the device housing via the opening in the device housing, the port, the internal cavity, and the sensor opening in the audio component housing.

In accordance with other aspects of the subject disclosure, a portable electronic device is provided that includes a device housing having an opening. The device also includes an audio component having an audio component housing that is disposed within the device housing, the audio component housing having a port and an internal cavity defined by an inner wall of the audio component housing. The port is disposed adjacent to the opening in the device housing to allow flow of air and sound between the internal cavity of the audio component housing and an environment outside the device housing through the opening via the port. The device also includes a pressure sensor at least partially embedded within the inner wall.

In accordance with other aspects of the subject disclosure, a smart phone is provided that includes a device housing defining a sealed internal cavity, the device housing having an opening. The smart phone also includes processing circuitry disposed within the sealed internal cavity. The smart phone also includes a speaker having a speaker housing disposed within the sealed internal cavity. The speaker housing includes a port sealingly coupled to the opening in the device housing, a first chamber adjacent the port, a second chamber adjacent the first chamber, and a speaker membrane in the second chamber. The smart phone also includes a pressure sensor that is fluidly coupled to an environment external to the device housing via the opening in the device housing and via at least a portion of the first chamber.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM, a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A portable electronic device, comprising:
a device housing including a main cavity having an opening;
an audio component having an audio component housing surrounded by the main cavity and disposed within the device housing, the audio component housing having a sensor opening and a port, the port being disposed within the opening in the device housing to allow flow of air and sound between an internal cavity of the audio component housing and an environment outside the device housing through the opening via the port;
a pressure sensor disposed in the main cavity of the device housing, wherein the pressure sensor is attached to a flexible circuit within the main cavity and the attachment and the pressure sensor are sealed with an encapsulation layer that is configured to seal the main cavity from the port of the audio component housing;
an audio component membrane disposed entirely within the internal cavity of the audio component housing, wherein the audio component membrane is configured to be operated by a processing circuit to clear a liquid from within the port and to protect the pressure sensor against the liquid,
wherein the port is at least partially covered with a mesh structure that is permeable to sound and air.

2. The portable electronic device of claim 1, wherein the main cavity is sealed to prevent ingress of liquid into the main cavity.

3. The portable electronic device of claim 2, wherein the audio component housing is disposed within the main cavity of the device housing.

4. The portable electronic device of claim 1, wherein the encapsulation layer is configured to prevent ingress of liquid into the main cavity of the device housing through the sensor opening.

5. The portable electronic device of claim 1, wherein the pressure sensor is mounted onto an external surface of the audio component housing adjacent the sensor opening.

6. The portable electronic device of claim 1, wherein at least a portion of the pressure sensor is disposed within the sensor opening.

7. The portable electronic device of claim 1, wherein the internal cavity of the audio component housing comprises a first chamber adjacent the port, a second chamber having the audio component membrane disposed therein, and a third chamber disposed on an opposing side of the second chamber from the first chamber.

8. The portable electronic device of claim 7, wherein the sensor opening in the audio component housing is formed in a wall of the first chamber.

9. The portable electronic device of claim 1, wherein the audio component is a speaker.

10. The portable electronic device of claim 1, wherein the audio component is a microphone.

11. A portable electronic device, comprising:
a device housing having an opening;
a pressure sensor disposed in a main cavity of the device housing; and
an audio component having an audio component housing that is disposed within the device housing, the audio component housing having a port and an internal cavity defined by an inner wall of the audio component housing, wherein the port is disposed adjacent to the opening in the device housing to allow flow of air and sound between the internal cavity of the audio component housing and an environment outside the device housing through the opening via the port, and wherein the audio component includes a membrane that is configured to be operated by a processing circuit to clear a liquid from within the port,
wherein the pressure sensor is attached to a flexible circuit within the main cavity and the attachment and the pressure sensor are sealed with an encapsulation layer that is configured to seal the main cavity from the port of the audio component housing, and wherein the port is at least partially covered with a mesh structure that is permeable to sound and air.

12. The portable electronic device of claim 11, wherein the pressure sensor comprises a pressure sensing element mounted in a recess in the inner wall.

13. The portable electronic device of claim 11, further comprising at least one contact on the audio component housing for communication with the pressure sensor, and at least one contact on the audio component housing for communication with control circuitry for an audio component membrane disposed entirely within the audio component housing.

14. The portable electronic device of claim 11, further comprising a sealing member between the port of the audio component housing and the device housing.

15. The portable electronic device of claim 11, further comprising electrical routing within the internal cavity or embedded within the audio component housing for routing pressure signals from the pressure sensor.

16. A smart phone, comprising:
- a device housing defining a sealed internal cavity, the device housing having an opening;
- processing circuitry disposed within the sealed internal cavity;
- a pressure sensor disposed in a main cavity of the device housing; and
- a speaker having a speaker housing disposed within the sealed internal cavity, wherein the speaker housing includes a port sealingly coupled to the opening in the device housing, a first chamber adjacent the port, a second chamber adjacent the first chamber, and a speaker membrane in the second chamber, and wherein the speaker membrane is configured to be operated by the processing circuitry to clear a liquid from within the port and to protect the pressure sensor against the liquid, wherein the pressure sensor is attached to a flexible circuit within the main cavity and the attachment and the pressure sensor are sealed with an encapsulation layer that is configured to seal the main cavity from the port of the speaker housing, and wherein the port is at least partially covered with a mesh structure that is permeable to sound and air.

17. The smart phone of claim 16, wherein the speaker housing comprises a third chamber that forms a back volume for the speaker.

18. The smart phone of claim 16, wherein the speaker housing comprises an opening and an external surface and wherein the pressure sensor is located adjacent the opening in the speaker housing and includes at least a portion in contact with the external surface.

19. The smart phone of claim 16, wherein the speaker housing comprises an opening and wherein the pressure sensor is located at least partially within the opening.

20. The smart phone of claim 16, wherein the pressure sensor is formed on an inner wall of the first chamber.

* * * * *